United States Patent [19]

Kawai et al.

[11] 4,276,773
[45] Jul. 7, 1981

[54] GAS FLOW MEASURING APPARATUS

[75] Inventors: Hisasi Kawai, Toyohashi; Tsuneyuki Egami, Aichi; Tokio Kohama, Nishio; Hideki Obayashi, Okazaki, all of Japan

[73] Assignee: Nippon Soken, Inc., Nishio, Japan

[21] Appl. No.: 102,352

[22] Filed: Dec. 11, 1979

[30] Foreign Application Priority Data

Feb. 22, 1979 [JP] Japan .................................. 54-20010

[51] Int. Cl.³ .............................................. G01F 1/68
[52] U.S. Cl. ....................................................... 73/204
[58] Field of Search ................. 73/204, 116; 323/75 H

[56] References Cited

U.S. PATENT DOCUMENTS 3,975,951 8/1976 Kohama et al. ........................ 73/116
4,067,233 1/1978 Obayashi et al. ....................... 73/116
4,089,214 5/1978 Egami et al. ........................... 73/204

Primary Examiner—Herbert Goldstein
Attorney, Agent, or Firm—Cushman, Darby & Cushman

[57] ABSTRACT

A gas flow measuring tube is provided in a duct through which gas to be measured is flown. In this gas flow measuring tube there are placed an electric heater and first and second temperature dependent resistors which are formed of resistance wires stretched across a plurality of respective insulator frames. A measuring circuit is provided for controlling electric power to be supplied to the electric heater in accordance with the resistance change of the temperature dependent resistors, and thereby measuring the amount of the flow of gas to be measured. The measured values are corrected in accordance with the temperature of the insulator frames.

6 Claims, 8 Drawing Figures

GAS FLOW MEASURING APPARATUS

CROSS REFERENCE TO RELATED APPLICATION

This application is related to U.S. patent application Ser. No. 92,024 entitled "GAS FLOW MEASURING DEVICE" filed on Nov. 7, 1979, by Hisashi Kawai, Tsuneyuki Egami, Tokio Kohama and Hideki Obayashi, assigned to the same assignee as that of this application.

BACKGROUND OF THE INVENTION

This invention relates to a gas flow measuring apparatus, and particularly to an air flow measuring apparatus for measuring the amount of flow of air which an engine, for example, sucks.

There has been proposed an apparatus which is arranged to have an electric heater and temperature-dependent resistors in a suction duct of an engine and thereby to detect the flow of intake air (gas to be measured).

This conventional apparatus has an advantage that amount of air flow can be measured with a small-sized and simple arrangement. However, this apparatus employs an electric heater and temperature-dependent resistors which are each formed of a ring member of electric insulating material and a resistance wire stretched across this ring member, so that if the temperature of the intake air (temperature of gas to be measured) is changed, an error associated with measurement is caused by the thermal response difference between the insulating ring member and resistance wire due to their different thermal capacities and by heat transmission at the contact points between the insulating ring members and resistance wires, thus preventing the amount of air flow from being measured precisely.

SUMMARY OF THE INVENTION

An object of this invention is to provide a gas flow measuring apparatus which is arranged in view of the above aspects to always enable detection of the amount of gas flow by weight with good accuracy even when the electric heater and temperature-dependent resistors, which are each formed of a wire stretched across an insulating ring member, are used for gas flow measurement.

The feature of this invention resides particularly in detecting the temperature of the insulating ring member so as to produce a detected signal for correction, thereby solving the above problems.

Other objects, features and advantages of this invention will become apparent from the following description taken in conjunction with the accompanying drawings, in which:

DESCRIPTION OF THE PREFERRED EMBODIMENTS

The present invention will now be described with reference to the drawings showing the embodiments.

Figure 1:
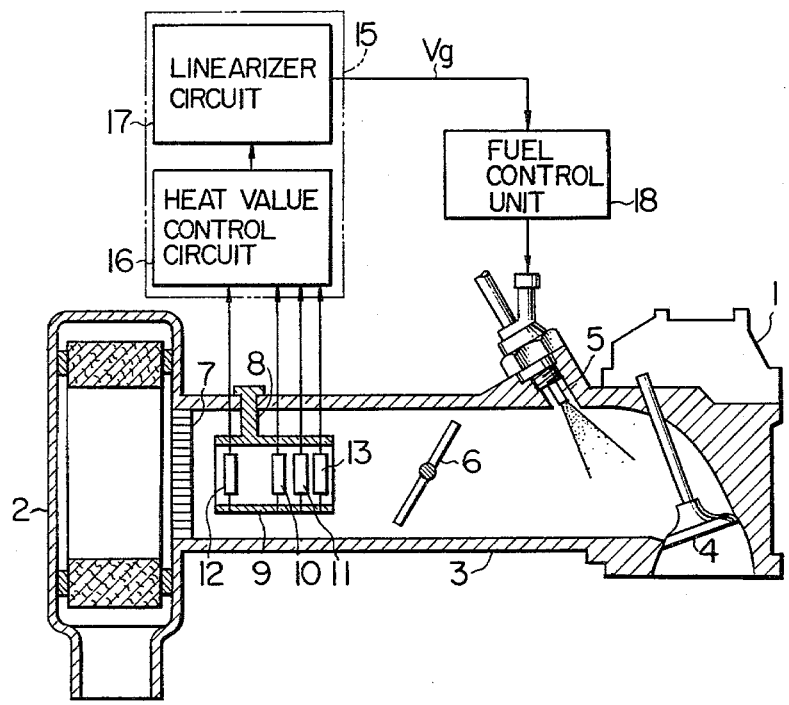
FIG. 1 shows the whole arrangement of one embodiment of this invention.

Referring to FIG. 1, reference numeral 1 designates an ignition-type engine body for driving an automobile, in which air for combustion is sucked through an air cleaner 2, a suction duct 3 and a suction valve 4. Fuel is supplied by an electromagnetic fuel injection valve 5 mounted on the suction duct 3.

The suction duct 3 is provided with a throttle valve 6 arbitrarily operated by a driver, and with a rectifying grid 7 for rectifying air flow at the junction with the air cleaner 2.

In the suction duct 3 between the rectifying grid 7 and the throttle valve 6 there is provided a small-sized flow measuring tube 9 which is placed substantially in parallel with the axial direction of the duct 3 and supported by a support 8. In this flow measuring tube 9 there are provided an electric heater 10 of a platinum resistance wire, a first temperature dependent resistor 11 of a platinum resistance wire located on the downstream side of and close to this electric heater 10, a second temperature dependent resistor 12 of a platinum resistance wire located on the upstream side of and rather remote from the electric heater 10, and a temperature compensation resistor 13 of a platinum wire located on the downstream side of the first temperature dependent resistor 11.

Figure 2:
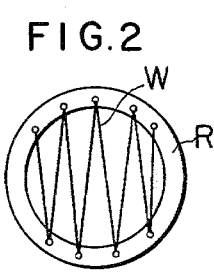
FIG. 2 is a front view showing the stretched condition of a platinum resistance wire.
Figure 3:
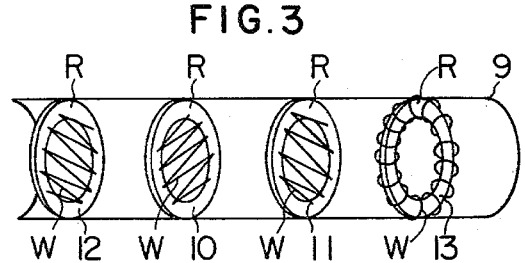
FIG. 3 is a perspective view of a main part thereof showing the electric heater, first and second temperature dependent resistors and a temperature compensation resistor as shown in FIG. 1.

The electric heater 10 and first and second temperature dependent resistors 11 and 12 are each formed of a frame or an insulating ring member R of electric insulating material and a platinum resistance wire W stretched in a lattice form across the ring member R as shown by FIG. 2, and they are arranged as shown in FIG. 3. The first and second temperature dependent resistors 11 and 12 utilize a platinum wire of the same resistance-temperature characteristic. The temperature compensation resistor 13, as shown in FIG. 3, is formed of the frame or insulating ring member R made of an electrically insulating material and of the same shape as those of the electric heater 10 and temperature dependent resistors 11 and 12, and a platinum resistance wire W of which the resistance changes with temperature and which is closely wound around the ring member R.

The electric heater 10, the first and second temperature dependent resistors 11 and 12 and the temperature compensation resistor 13 are all connected to a measuring circuit 15 which serves to measure the amount of flow of intake air and to produce an electrical signal in accordance with the amount of air flow. This measuring circuit 15 consists of a heat value control circuit 16 and a linearizing circuit 17. The heat value control circuit 16 is responsive to the output signal of a bridge circuit including the first and second temperature dependent resistors 11 and 12 and the temperature compensation resistor 13 so as to control the voltage to be applied to the electric heater 10 and this bridge circuit. The linearizing circuit 17 functions to correct the output signal from the heat value control circuit 16 so as to be linear with respect to the amount of intake air flow.

A fuel control unit 18 as shown in FIG. 1 is responsive to a signal from the measuring circuit 15 to control the time during which the electromagnetic fuel injection valve 5 opens, and is supplied with a signal from a revolution speed sensor (not shown) for detecting the revolution speed of engine. This fuel control unit 18 is of the conventional type.

Figure 4:
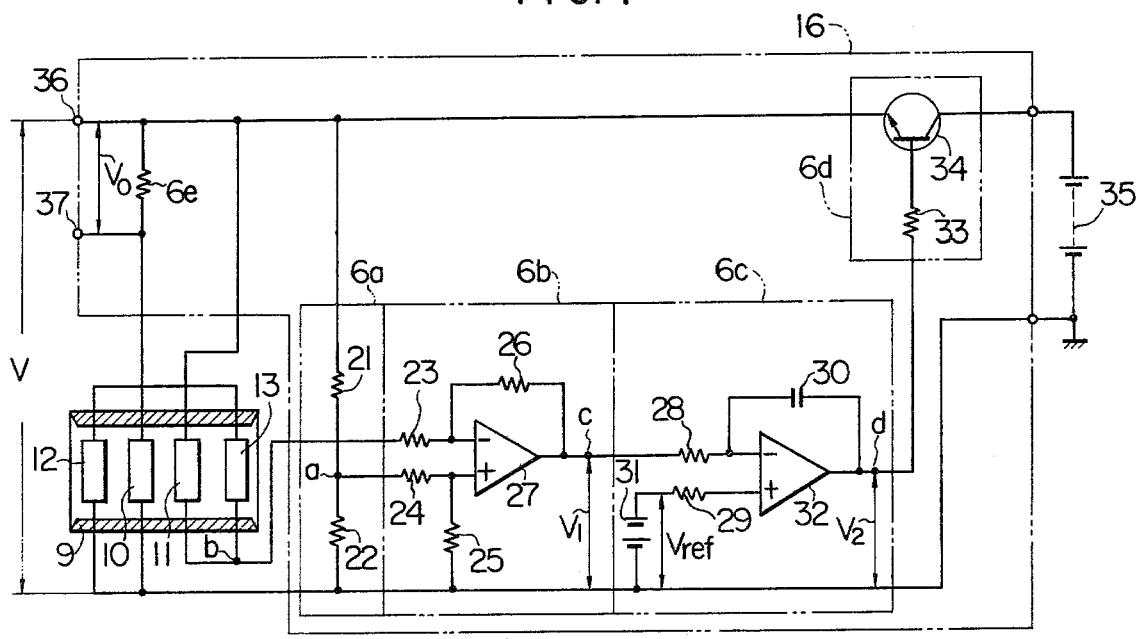
FIG. 4 is an electric circuit diagram of a heat value control circuit shown in FIG. 1.

The heat value control circuit 16 will hereinafter be described with reference to FIG. 4. This heat value control circuit 16 is generally composed of a reference resistor 6a, a first differential amplifier circuit 6b, a second differential amplifier circuit 6c, a power amplifier circuit 6d and an output resistor 6e.

The reference resistor 6a consists of resistors 21 and 22 which constitute the bridge circuit together with the first and second temperature dependent resistors 11 and 12 and the temperature compensation resistor 13.

The first differential amplifier circuit 6b includes input resistors 23 and 24, a ground resistor 25, a negative feedback resistor 26 and an operational amplifier (hereinafter, referred to as "OP amp") 27, and functions to differentially amplify the voltage between diagonal points a and b of the bridge circuit to produce an output at a terminal c.

The second differential amplifier circuit 6c includes input resistors 28 and 29, a capacitor 30, a reference voltage source 31 and an OP amp 32, and differentially amplifies the output voltage at the terminal c and a constant reference voltage $V_{ref}$ of the reference voltage source 31 to produce an output at a terminal d. The capacitor 30 serves to prevent oscillation of this circuit.

The power amplifier circuit 6d includes a resistor 33 and a power transistor 34 which is supplied with power from a battery 35, and amplifies the output voltage from the second amplifier circuit 6c to produce an output and supply it to the bridge circuit and the electric heater 10.

The output resistor 6e is used to supply the voltage concerning the amount of flow of intake air to the linearizing circuit 17 and connected in series with the electric heater 10. Terminals 36 and 37 of the output resistor 6e are connected to the linearizing circuit 17.

Figure 5:
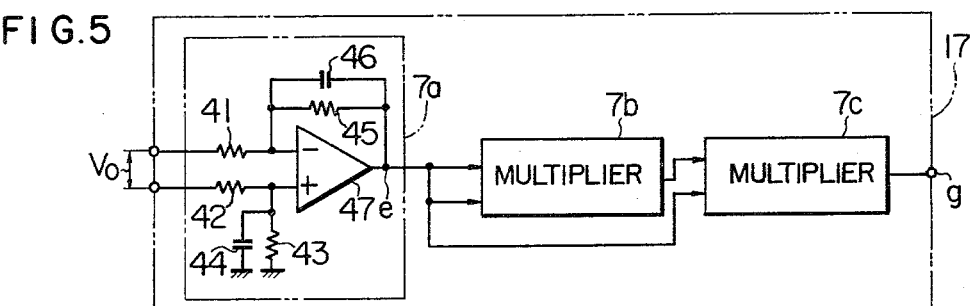
FIG. 5 is an electric circuit diagram of a linearizing circuit shown in FIG. 1.

The linearizing circuit 17 will now be described with reference to FIG. 5. This linearizing circuit 17 generally includes a differential amplifier circuit 7a and multipliers 7b and 7c.

The differential amplifier circuit 7a includes input resistors 41 and 42, a ground resistor 43, a ground capacitor 44, a negative feedback resistor 45, a capacitor 46 and an OP amp 47, and functions to differentially amplify an output voltage $V_o$ from the heat value control circuit 16 to produce an output at a terminal e.

The multipliers 7b and 7c are of a well known analog type and function to multiply two input voltages to produce an voltage in accordance with the product.

The operation of the above-mentioned arrangement will next be described. In FIG. 1, the amount of air determined by the degree to which the throttle valve 6 opens is sucked into the engine body 1 through the air cleaner 2 and the suction duct 3. Of this total intake air, a certain amount of air is passed through the air flow measuring tube 9 to the engine body 1.

The second temperature dependent resistor 12 on the upstream side of the electric heater 10 within the air flow measuring tube 9 is affected only by the temperature of intake air, while the first temperature dependent resistor 11 on the downstream of the electric heater 10 is affected by the temperature of intake air and the amount of heat generated by the electric heater 10, that is, the temperature of air heated by the electric heater 10.

As a result, a temperature difference ΔT between the temperature dependent resistors 11 and 12 appears which is dependent on the electric power P[W] supplied to the electric heater 10 and the amount of intake air flow G [g/sec] as expressed by $$K_1 \cdot \Delta T = P/G \tag{1}$$

where $K_1$ is a constant.

The temperature dependent resistors 11 and 12 change in resistance with the temperature of intake air, so that between the points a and b of the bridge there is produced a potential difference ΔV which is governed by the temperature difference ΔT and the voltage V applied to the bridge circuit as shown by $$\Delta V = K_2 \cdot \Delta T \cdot V \tag{2}$$

where $K_2$ is a constant.

Thus, from Equations (1) and (2) the following relationship is derived:

$$K_3 \cdot \Delta V/V = P/G \tag{3}$$

where $K_3$ is a constant.

Thus, if the ΔV is held constant by controlling the power supplied to the heater 10 and the voltage applied to the bridge, the amount G of intake air flow can be expressed by $$G = K_4 \cdot P \cdot V \tag{4}$$

where $K_4$ is a constant.

If the value of the output resistor 6e is selected small as compared with that of the electric heater 10 and the current flowing through the electric heater 10 is taken as I, the following equations are given:

$$P \doteq K_5 \cdot I^2 \tag{5}$$

$$V \doteq K_6 \cdot I \tag{6}$$

where $K_5$ and $K_6$ are constants.

Thus, from Equations (5) and (6), Equation (4) can be expressed as follows:

$$G \doteq K \cdot I^3 \tag{7}$$

$$\doteq K' \cdot V^3 \tag{8}$$

where K and K' are constants. From the Equations (7) and (8) it will be seen that the amount G of intake air flow is the function of the cube of the current I (or voltage V). The equations (7) and (8) can be practically used in the measurement without influence on accuracy, though they are approximate.

Thus, the heat value control circuit 16 is used to control the amount of heat generated by the electric heater 10 thereby to hold the potential difference ΔV constant. In other words, in FIG. 4 if the amount of intake air flow is increased, the temperature rise of air heated by the heater 10 is decreased, resulting in decrease of the temperature difference ΔT between the first and second temperature dependent resistors 11 and 12 and hence decrease of the potential difference ΔV between the points a and b of the bridge circuit.

Therefore, the output voltage $V_1$ from the first differential amplifier circuit 6b is decreased, whereas the output voltage $V_2$ from the second differential amplifier circuit 6c is increased in accordance with the relationship of ($V_{ref} - V_1$). The power amplifier circuit 6d thus increases the current to the electric heater 10 thereby to cause the heater 10 to generate more heat.

As a consequence, the temperature difference ΔT between the first and second temperature dependent resistors 11 and 12 increases, resulting in the increase of the potential difference ΔV between the points a and b of the bridge circuit. When the voltage $V_1$ in accordance with the potential difference ΔV equals to the reference voltage $V_{ref}$, the whole system becomes in the stabilized state, while the bridge circuit is not equilibrium state.

If the amount of intake air flow is decreased, the temperature rise of air heated by the electric heater 10 is increased, resulting in the increase of the temperature difference ΔT between the first and second temperature dependent resistors 11 and 12 and hence increase of the potential difference ΔV.

Accordingly, the output voltage $V_1$ from the first differential amplifier circuit 6b becomes large whereas the output voltage $V_2$ from the second differential amplifier circuit 6c decreases. The power amplifier circuit 6d thus decreases the current to the electric heater 10 thereby to cause the electric heater 10 to decrease heat generation.

As a result, the temperature difference ΔT is decreased and hence the potential difference ΔV is narrowed. When the voltage $V_1$ in accordance with the potential difference ΔV equals the reference voltage $V_{ref}$, the system and the bridge circuit both become stable.

Thus, the potential difference ΔV between the points a and b of the bridge circuit is always held at the constant value $V_{ref}$, independent of the amount of intake air flow, and thus Equation (7) is satisfied, that is, the amount G of intake air flow is expressed by the function of the cube of the current I flowing through the electric heater 10.

This current I also flows through the output resistor 6e, so that the current I is proportional to the voltage $V_o$ across the output resistor 6e and the cube of the voltage $V_o$ varies as the amount G of intake air flow.

Thus, the output voltage $V_o$ from the heat value control circuit 16 is cubed in the linearizing circuit 17. That is, in FIG. 5, the voltage across the output resistor 6e in the heat value control circuit 16 is amplified by the differential amplifier circuit 7a and thus the voltage of $A_1 \cdot V_o$ is produced at the terminal e, where $A_1$ is the amplification factor of the circuit 7a.

This output voltage $A_1 \cdot V_o$ is supplied to both the input terminals of the multiplier 7b, which then produces voltage of $A_1^2 \cdot V_o^2$. The multiplier 7c is supplied with the voltages of $A_1 \cdot V_o$ and $A_1^2 \cdot V_o^2$ and produces output voltage of $A_1^3 \cdot V_o^3$.

Thus, the linearizing circuit 17 produces at its output terminal g a voltage proportional to the cube of the voltage $V_o$, or a voltage $V_g$ proportional to the amount of intake air flow.

This voltage $V_g$ is applied to the fuel control unit 18 as a signal indicative of the amount G of intake air flow, and the fuel control unit 18 is responsive to this signal and the output signal from the revolution speed sensor (not shown) to produce at its output an injection pulse signal which causes the fuel injection valve 5 to open. The engine body 1 is thus supplied with air and fuel at a correct air-to-fuel ratio, and thus operated with improved exhaust gas purification, output power and fuel consumption.

When the engine is used for driving an automobile, the temperature of the intake air (gas to be measured) in the engine body 1 is changed considerably and thus it is necessary to prevent an error from occuring upon measurement. That is, when a car is stopped with the engine being in the idling condition, the temperature within the engine room rises due to exhaust gas heat and thus the temperature of the air sucked in the engine body 1 (hereinafter, referred to as "intake air temperature") increases to more than the temperature of the atmosphere. When a car is driven at a low speed on the streets of a town, the above phenomenon often occurs.

Moreover, when cars are accelerated from such an idling condition or low-speed driving to a high-speed driving condition, the temperature within the engine room is rapidly reduced from high temperature to substantially atmospheric temperature because external air is forced into the engine room. This rapid temperature change often occurs.

If the intake air temperature is increased from atmospheric temperature, the air flow measuring apparatus rises in temperature because of heat movement from air to the apparatus. In this case, the resistance wire W swiftly follows the change of the intake air temperature, but the insulating ring body R for holding the resistance wire W does not swiftly follow the change of the intake air temperature because the ring body R has a large heat capacity and follows it with a delay time.

Thus, when the intake air temperature is rising, a temperature difference between the insulating ring member R and the resistance wire W becomes larger than that in the case when the intake air temperature stays constant. Since the air flow measuring apparatus of this kind performs air flow measurement by measuring the temperature rise due to heat generation in the electric heater 10, a measurement error occurs, disabling the high precision measurement in the apparatus unless the electric power supplied to the electric heater (the amount of heat generation) and the temperature rise have a constant relation at all times.

Under the above condition (namely, when the temperature difference between the insulating ring member and the resistance wire is larger than a certain temperature difference which occurs when the intake air temperature is kept constant), even though the electric heater 10 is supplied with the same power as that at a normal condition (i.e. when the certain temperature difference occurs between the insulating ring member and the resistance wire), the heat conducted from the electric heater 10 to the first temperature dependent resistor 11 is more run away through the contacts between the resistance wire W and the insulating ring member R than in the case where the intake air temperature is constant.

Thus, the temperature difference ΔT which is to be produced by the power P when the intake air temperature is at a normal condition (see Equation (1)) cannot be obtained, that is to say, a desired voltage difference (see Equation (3)) cannot be obtained. To make the potential difference ΔV constant, it is necessary to generate more heat than when the intake air temperature is constant.

As a result, the amount of heat generation, or the output of the power amplifier circuit 6d is increased by the heat loss run away to the insulating ring member R, thus causing a measurement error.

When the intake air temperature becomes equal to the temperature of the insulating ring member R, the electric heater 10 returns to the heat relation at a constant temperature. The result is that the large amount of power necessary for the temperature difference between the insulating ring member R and the resistance wire W is applied to the electric heater 10. Thus, the potential difference $\Delta V$ becomes larger than a set value, causing a measurement error and subsequently the power to be applied to the electric heater 10 is decreased to make the potential difference $\Delta V$ a set value.

In this case, the temperature difference between the insulating ring member R and the resistance wire W for both the first and second temperature dependent resistors 11 and 12 becomes larger than when the intake air temperature is constant. However, since the temperature dependent resistors 11 and 12 are parts of the bridge circuit, the extra difference is cancelled out, not causing the above problem. Thus, trouble occurs only between the resistance wire and the insulating ring member R of the electric heater 10.

On the other hand, when the intake air temperature is decreasing from a certain temperature, heat is conducted from the insulating ring member R to the resistance wire W through the contacts therebetween, contrary to the above case, so that the power (output) from the electric heater 10 is once reduced excessively, thereby causing a measurement error. Subsequently, the temperature difference between the resistance wire W and the insulating ring member R equals that in the case where the intake air temperature is constant, and the heater 10 becomes stable at the same output as at constant temperature, or at a proper output.

If any compensation is not made for the change of the intake air temperature as described above, the output of the power amplifier circuit 6d is undesirably changed with the change of the intake air temperature irrespective of the amount of air flow, and thus an error temporarily occurs upon measurement of the amount of air flow.

In this invention, however, the measurement error due to the change of the intake air temperature can be prevented as described later. That is, as the intake air temperature rises, the temperatures of the first and second temperature dependent resistors 11 and 12 swiftly follow the change, but the temperature of the insulating rings R does not follow swiftly this change. Thus, since the temperature of the insulating rings R is lower than the intake air temperature, the temperature compensation resistor 13 for detecting the temperature of the insulating ring member R is also lower than the intake air temperature, and hence exhibits a low resistance value. As a result, the point-b potential of the bridge circuit is shifted by a certain potential in the positive direction. The potential difference $\Delta V$ between the diagonal points of the bridge is higher by this shifted value than the inherent potential difference $\Delta V$ appearing due to the heat generated by the electric heater 10. Consequently, the electric heater 10 is forced to generate a smaller amount of heat. Thus, the output of the power amplifier circuit 6d can be prevented from being changed by the heat loss from the electric heater 10 to the insulating ring member R.

On the other hand, when the intake air temperature is decreased from a normal value, the temperatures of the first and second temperature dependent resistors 11 and 12 swiftly follow the change of the intake air temperature. But, the potential at the point b of the bridge is shifted by a certain amount of potential in the negative direction because the temperatures of the insulating ring members R are higher than the intake air temperature and thus the temperature compensation resistor 13 for detecting the temperature of the insulating ring member R is also higher in temperature than the intake air temperature, and hence takes a higher resistance value. In other words, the potential difference $\Delta V$ between the diagonal points of the bridge is lower by this negative shift value than the inherent potential difference $\Delta V$ which is caused by heat generated from the electric heater 10, and thus the electric heater 10 generates a larger amount of heat.

Accordingly, the output of the power amplifier circuit 6d can be prevented from being changed by transmission of heat from the insulating ring member R to the resistance wire W and vice versa.

Figure 6:
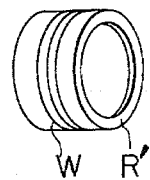
FIG. 6 is a perspective view of a main part of another embodiment of this invention.
Figure 7:
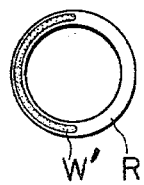
FIG. 7 is a front view of a main part of still another embodiment of this invention.

While in the above embodiment the temperature correction resistor 13 is formed by winding a platinum resistance wire W around the same insulating ring member R as those of the electric heater 10 and temperature dependent resistors 11 and 12, the temperature correction resistor 13 may be formed by winding the platinum resistance wire W around a cylindrical insulating ring member R' as shown in FIG. 6. This temperature compensation resistor 13 may also be formed as a film resistor which is, as shown in FIG. 7, directly deposited onto the insulating ring member R by evaporation, thick-film technique and other printing techniques.

Moreover, while in the above embodiment the temperature compensation resistor 13 is provided on a separate insulating ring member R from those of the electric heater 10 and temperature dependent resistors 11 and 12, the same may be provided on the same insulating ring member as those of the electric heater and the temperature dependent resistors.

While in the above embodiment the temperature compensation resistor 13 is connected in series with the second temperature dependent resistor 12 of the bridge, the resistor 13 may be connected in parallel with the second temperature dependent resistor 12 or provided on the opposite side of the second temperature dependent resistor 12 of the bridge, thereby similarly permitting the correction and the measuring of the amount of gas flow by weight with good accuracy at all times.

Figure 8:
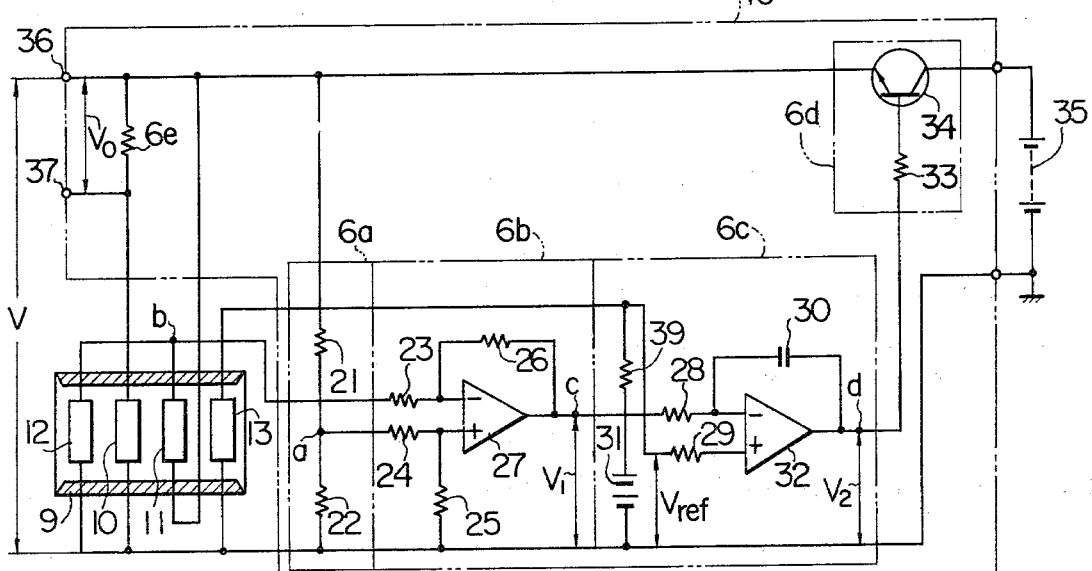
FIG. 8 is an electric circuit diagram of a main part of further another embodiment of this invention.

Moreover, as shown in FIG. 8, a resistor 39 may be additionally connected to the resistor 29, the junction thereof being at the reference potential $V_{ref}$ for the potential difference $\Delta V$, and thereby the correction can also be made with the same effect.

While a fuel injection type engine is used in the above embodiments, a carburetor type engine may be used in which the amounts of the exhaust gas recirculation and ignition advance can be controlled by the amount of intake air flow. The present invention can be applied to other combustion mechanisms than engines, for measuring the amount of gas flow.

Furthermore, the linearizing circuit 17 used in the measuring circuit 15 can be replaced by a ROM (read-only memory) or the like for digital signal processing, or omitted if the linear output is not required.

It will be apparent that many modifications and advantages may be effected without departing from the scope of the novel concepts of this invention.

We claim:

1. A gas flow measuring apparatus comprising:
   a gas flow measuring tube provided in a duct through which gas to be measured is flown;
   an electric heater provided in said gas flow measuring tube;
   a first temperature dependent resistor provided in said gas flow measuring tube on the downstream side of said electric heater;
   a second temperature dependent resistor provided in said gas flow measuring tube at a position where there is substantially no thermal effect of said electric heater, said electric heater and said first and second temperature dependent resistors each including an insulator frame and a resistance wire stretched across said frame;
   a temperature compensation resistance means provided in said gas flow measuring tube, and which exhibits a resistance value indicative of the temperature of said insulator frame; and
   a measuring circuit connected with said electric heater, said first and second temperature dependent resistors and said temperature compensation resistance means, for controlling electric power to be supplied to said electric heater in accordance with resistance change of said first and second temperature dependent resistors so as to measure the amount of flow of gas to be measured, the control of power supply to said electric heater being corrected in accordance with the resistance value of said temperature compensation resistance means.

2. A gas flow measuring apparatus according to claim 1, wherein said temperature compensation resistance means includes another insulator frame and a resistance wire wound around said another insulator frame.

3. A gas flow measuring apparatus according to claim 1, wherein said temperature compensation resistance means includes a resistance wire wound around one of the insulator frames of said electric heater and said first and second temperature dependent resistors.

4. A gas flow measuring apparatus according to claim 1, wherein said temperature compensation resistance means includes a film-shaped resistor deposited onto one of the insulator frames of said electric heater and said first and second temperature dependent resistors.

5. A gas flow measuring apparatus according to claim 1, 2, 3 or 4, wherein said temperature compensation resistor means is inserted in a bridge circuit which is formed of reference resistors and said first and second temperature dependent resistors.

6. A gas flow measuring apparatus according to claim 1, 2, 3 or 4, wherein said measuring circuit includes a differential amplifier circuit having input terminals to which are applied a predetermined reference voltage and a voltage corresponding to the resistance change of said first and second temperature dependent resistors, said temperature compensation resistor means being connected to the input terminal to which said predetermined reference voltage is applied.

* * * * *